United States Patent
Makotyn et al.

(10) Patent No.: US 11,600,482 B2
(45) Date of Patent: *Mar. 7, 2023

(54) APPARATUSES, SYSTEMS, AND METHODS FOR ION TRAPS

(71) Applicant: Quantinuum LLC, Broomfield, CO (US)

(72) Inventors: Philip Makotyn, Arvada, CO (US);
David Hayes, Denver, CO (US);
Russell Stutz, Broomfield, CO (US);
Patricia Lee, Broomfield, CO (US);
John Gaebler, Golden, CO (US);
Christopher Langer, Highlands Ranch, CO (US)

(73) Assignee: Quantinuum LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,507

(22) Filed: May 5, 2021

(65) Prior Publication Data

US 2021/0319999 A1    Oct. 14, 2021

Related U.S. Application Data

(63) Continuation of application No. 16/717,602, filed on Dec. 17, 2019, now Pat. No. 11,037,776.

(51) Int. Cl.
*H01J 49/42* (2006.01)
*H01J 49/06* (2006.01)

(52) U.S. Cl.
CPC .......... *H01J 49/422* (2013.01); *H01J 49/065* (2013.01); *H01J 49/4295* (2013.01)

(58) Field of Classification Search
CPC .... H01J 49/422; H01J 49/065; H01J 49/4295; H01J 3/38; H01J 49/4245; H01J 49/10;
(Continued)

(56) References Cited

U.S. PATENT DOCUMENTS 9,548,179 B2 * 1/2017 Cho ...................... H01J 49/422
9,548,191 B2 * 1/2017 Youngner .............. G06N 20/00
(Continued)

FOREIGN PATENT DOCUMENTS

JP    2016-514896 A    5/2016
JP    2019-060881 A    4/2019

OTHER PUBLICATIONS

English Translation of KR Office Action dated Aug. 3, 2022 for KR Application No. 10-2020-0170303, 3 pages.
(Continued)

*Primary Examiner* — David A Vanore
(74) *Attorney, Agent, or Firm* — Alston & Bird LLP

(57) ABSTRACT

An ion trap apparatus is provided. The ion trap apparatus comprises two or more radio frequency (RF) rails formed with substantially parallel longitudinal axes and with substantially coplanar upper surfaces; and two or more sequences of trapping and/or transport (TT) electrodes with each sequence formed to extend substantially parallel to the substantially parallel longitudinal axes of the RF rails. The two or more RF rails and the two or more sequences of TT electrodes define an ion trap. The two or more sequences of TT electrodes are arranged into a number of zones. Each zone comprises wide matched groups of TT electrodes and at least one narrow matched group of TT electrodes. A wide TT electrode is longer and/or wider in a direction substantially parallel to the substantially parallel longitudinal axes of the RF rails than a narrow TT electrode.

20 Claims, 6 Drawing Sheets

(58) Field of Classification Search
CPC ........ B82Y 10/00; G06N 10/40; G06N 10/00; G21K 1/00
See application file for complete search history.

(56) References Cited

U.S. PATENT DOCUMENTS

| | | | | |
|---|---|---|---|---|
| 9,558,908 | B2* | 1/2017 | Youngner | H01J 9/14 |
| 9,916,957 | B2* | 3/2018 | Youngner | H01J 3/38 |
| 10,186,409 | B2* | 1/2019 | Youngner | G06N 10/00 |
| 10,242,859 | B2* | 3/2019 | Kim | H01J 3/40 |
| 10,304,650 | B2* | 5/2019 | Youngner | H01J 49/0018 |
| 10,418,443 | B1 | 9/2019 | Nordquist et al. | |
| 10,546,734 | B1* | 1/2020 | Youngner | H01J 49/00 |
| 11,037,776 | B1* | 6/2021 | Makotyn | H01J 49/422 |
| 2016/0027604 | A1* | 1/2016 | Cho | H01J 9/14 |
| | | | | 250/489 |
| 2016/0071715 | A1 | 3/2016 | Anderson et al. | |
| 2016/0322188 | A1* | 11/2016 | Youngner | H01J 9/14 |
| 2016/0343563 | A1 | 11/2016 | Youngner | |
| 2017/0221693 | A1* | 8/2017 | Kim | H01J 49/424 |
| 2017/0316335 | A1* | 11/2017 | Kim | G06N 10/00 |
| 2019/0004011 | A1 | 1/2019 | Garimella et al. | |
| 2019/0369050 | A1 | 12/2019 | Garimella et al. | |
| 2020/0227226 | A1* | 7/2020 | Youngner | H01J 49/0018 |

OTHER PUBLICATIONS

KR Office Action dated Aug. 3, 2022 for KR Application No. 10-2020-0170303, 3 pages.
CA Office Action dated Jan. 11, 2022 for CA Application No. 3101927, 4 pages.
English Translation of JP Office Action, including Search Report, dated Jan. 5, 2022, for JP Application No. 2020203581, 13 pages.
JP Office Action Mailed, including Search Report, dated Jan. 5, 2022 for JP Application No. 2020203581, 10 pages.
AU Notice of Allowance dated Jun. 9, 2022 for AU Application No. 2020277183, 3 pages.
Guise, Nicholas D. et al., "Ball-grid array architecture for microfabricated ion traps," Journal of Applied Physics 117, 174901-1-174901-10 (2015); https://doi.org/10.1063/1.4917385.
Notice of Allowance and Fees Due (PTOL-85) dated Mar. 10, 2021 for U.S. Appl. No. 16/717,602.
Partial European Search Report issued in European Application No. 20211376.7 dated May 7, 2021, 14 pages.
English translation of JP Decision to Grant dated May 17, 2022 for JP Application No. 2020203581, 2 pages.
JP Decision to Grant dated May 17, 2022 for JP Application No. 2020203581, 3 pages.
European Search Report and Search Opinion Received for EP Application No. 20211376.7, dated Sep. 21, 2021, 17 pages.
Examination Report No. 1 issued in Australian Application No. 2020277183 dated Sep. 3, 2021, 5 pages.
James D Siverns et al: "Ion trap architectures and new directions", arxiv.org, Cornell University Library, 201 Olin Library Cornell University Ithaca, NY 14853, Aug. 15, 2017 (Aug. 15, 2017).
Stevens Kelly E et al: "Automating quantum experiment control", Quantum Inf Process (2017) 16:56, pp. 1-20.
English translation of KR Notice of Allowance dated Jan. 2, 2023 for KR Application No. 10-2020-0170303.
KR Notice of Allowance dated Jan. 2, 2023 for KR Application No. 10-2020-0170303.

* cited by examiner

APPARATUSES, SYSTEMS, AND METHODS FOR ION TRAPS

CROSS-REFERENCE TO RELATED APPLICATIONS

This application is a continuation of U.S. application Ser. No. 16/717,602, filed Dec. 17, 2019, the content of which is hereby incorporated by reference in its entirety.

TECHNICAL FIELD

Various embodiments relate to apparatuses, systems, and methods for ion traps.

BACKGROUND

An ion trap can use a combination of electrical and magnetic fields to capture one or more ions in a potential well. Ions can be trapped for a number of purposes, which may include mass spectrometry, research, and/or controlling quantum states, for example. Through applied effort, ingenuity, and innovation many deficiencies of such prior ion traps have been solved by developing solutions that are structured in accordance with the embodiments of the present invention, many examples of which are described in detail herein.

BRIEF SUMMARY OF EXAMPLE EMBODIMENTS

Example embodiments provide ion trap apparatuses, quantum computers comprising ion trap apparatuses, quantum computer systems comprising ion trap apparatuses, and/or the like.

In an example embodiment, an ion trap apparatus is provided. The ion trap apparatus comprises two or more radio frequency (RF) rails formed with substantially parallel longitudinal axes and with substantially coplanar upper surfaces; and two or more sequences of trapping and/or transport (TT) electrodes with each sequence formed to extend substantially parallel to the substantially parallel longitudinal axes of the two or more RF rails. The two or more RF rails and the two or more sequences of TT electrodes define an ion trap. In an example embodiment, the ion trap is a surface planar ion trap. The two or more sequences of TT electrodes are arranged into a number of zones. Each zone comprises wide matched groups of TT electrodes and at least one narrow matched group of TT electrodes. A wide TT electrode of one of the wide matched groups of TT electrodes is longer and/or wider in a direction substantially parallel to the substantially parallel longitudinal axes of the two or more RF rails than a narrow TT electrode of the at least one narrow matched group of TT electrodes.

In an example embodiment, each zone comprises two wide matched groups of TT electrodes and the at least one narrow matched group of TT electrodes is disposed between the two wide matched groups of TT electrodes. In an example embodiment, each wide TT electrode of the wide matched groups of TT electrodes is at least approximately twice as wide as a narrow TT electrode of the at least one narrow matched group of TT electrodes in the direction substantially parallel to the substantially parallel longitudinal axes of the RF rails. In an example embodiment, (a) the number of zones comprises at least one action zone and at least one intermediary zone, (b) the at least one action zone is configured for an action to be performed on at least one ion within the at least one action zone, and (c) the at least one intermediary zone is configured for stabilizing the at least one ion within the intermediary zone and/or enabling transport of the at least one ion through at least a portion of the intermediary zone. In an example embodiment, the at least one action comprises at least one of (a) interacting at least two ions within the ion trap or (b) acting on at least one ion within the ion trap with a manipulation source. In an example embodiment, the manipulation source is one of at least one laser beam or at least one microwave field. In an example embodiment, the at least one action zone is configured to have a quantum logic gate performed on an ion within the at least one action zone. In an example embodiment, the at least one action zone comprises three narrow matched groups of TT electrodes disposed between two wide matched groups of TT electrodes. In an example embodiment, the at least one action zone comprises a plurality of narrow matched groups of TT electrodes that are configured to generate an electrical potential that may be adjusted from a single well potential to a multiple well potential within the at least one action zone. In an example embodiment, the at least one intermediary zone comprises one narrow matched group of TT electrodes disposed between two wide matched groups of TT electrodes. In an example embodiment, the at least one action zone comprises at least two action zones and the at least one intermediary zone is disposed between the at least two action zones. In an example embodiment, the plurality of zones comprises at least one storage zone. In an example embodiment, the at least one storage zone comprises at least three narrow matched groups of TT electrodes disposed between two wide matched groups of TT electrodes.

In an example embodiment, the ion trap apparatus further comprises a loading zone configured for loading ions into the ion trap. In an example embodiment, (a) the two or more RF rails are disposed between a first and third sequence of TT electrodes, (b) the two or more RF rails form at least one longitudinal gap, and (c) a second sequence of TT electrodes is disposed within/along the longitudinal gap. In an example embodiment, the two or more of sequences of TT electrodes are configured to be operated so as to cause an ion within the ion trap to be transported along at least a portion of a confinement region, the confinement region extending substantially parallel to the substantially parallel longitudinal axes of the two or more RF rails. In an example embodiment, the ion trap apparatus further comprises a plurality of TT leads, each TT lead being in electrical communication with only one TT electrode of the two or more of sequences of TT electrodes. In an example embodiment, the ion trap apparatus further comprises or is in electrical communication with a number of TT electrode drivers, each TT electrode driver in electrical communication with one TT electrode via a corresponding TT lead. In an example embodiment, each TT electrode of the two or more sequences of TT electrodes is operated independently. In an example embodiment, each TT electrode of the number of sequences of TT electrodes is configured to be biased with a TT voltage in the range of approximately −20 Volts to +20 Volts. In an example embodiment, the ion trap apparatus is part of a trapped ion quantum computer.

In an example embodiment, an ion trap apparatus is provided. The ion trap apparatus comprises two or more radio frequency (RF) rails formed with substantially parallel longitudinal axes; and two or more sequences of trapping and/or transport (TT) electrodes with each sequence formed to extend substantially parallel to the substantially parallel longitudinal axes of the RF rails. The two or more RF rails and the two or more sequences of TT electrodes define an ion trap. The two or more sequences of TT electrodes are arranged into a plurality of zones. The plurality of zones comprises at least one action zone and at least one intermediary zone. The at least one action zone is configured for an action to be performed on at least one ion within the at least one action zone. The at least one intermediary zone is configured for performing multiple functions, including stabilizing the at least one ion within the intermediary zone and enabling transport of the at least one ion through at least a portion of the intermediary zone.

In an example embodiment, each zone comprises two or more wide matched groups of TT electrodes and at least one narrow matched group of TT electrodes, wherein a wide TT electrode of one of the matched groups of TT electrodes is longer and/or wider in a direction substantially parallel to the substantially parallel longitudinal axes of the two or more RF rails than a narrow TT electrode of the at least one narrow matched group of TT electrodes. In an example embodiment, each zone comprises two wide matched groups of TT electrodes and the at least one narrow matched group of TT electrodes is disposed between the two wide matched groups of TT electrodes. In an example embodiment, each wide TT electrode of the wide matched groups of TT electrodes is at least approximately twice as wide as a narrow TT electrode of the at least one narrow matched group of TT electrodes in the direction substantially parallel to the substantially parallel longitudinal axes of the RF rails. In an example embodiment, the at least one action comprises at least one of (a) interacting at least two ions within the ion trap or (b) acting on at least one ion within the ion trap with a manipulation source. In an example embodiment, the manipulation source is one of at least one laser beam or at least one microwave field. In an example embodiment, the at least one action zone is configured to have a quantum logic gate performed on an ion within the at least one action zone. In an example embodiment, the at least one action zone comprises three narrow matched groups of TT electrodes disposed between two wide matched groups of TT electrodes. In an example embodiment, the at least one action zone comprises a plurality of narrow matched groups of TT electrodes that are configured to generate an electrical potential that may be adjusted from a single well potential to a multiple well potential within the at least one action zone. In an example embodiment, the at least one intermediary zone comprises one narrow matched group of TT electrodes disposed between two wide matched groups of TT electrodes. In an example embodiment, the at least one action zone comprises at least two action zones and the at least one intermediary zone is disposed between the at least two action zones. In an example embodiment, the plurality of zones comprises at least one storage zone. In an example embodiment, the at least one storage zone comprises at least three narrow matched groups of TT electrodes disposed between two wide matched groups of TT electrodes.

In an example embodiment, the ion trap apparatus further comprises a loading zone configured for loading ions into the ion trap. In an example embodiment, (a) the two or more RF rails are disposed between a first and third sequence of TT electrodes, (b) the two or more RF rails form at least one longitudinal gap, and (c) a second sequence of TT electrodes is disposed within/along the longitudinal gap. In an example embodiment, the two or more of sequences of TT electrodes are configured to be operated so as to cause an ion within the ion trap to be transported along at least a portion of a confinement region, the confinement region extending substantially parallel to the substantially parallel longitudinal axes of the two or more RF rails. In an example embodiment, the ion trap apparatus further comprises a plurality of TT leads, each TT lead being in electrical communication with only one TT electrode of the two or more of sequences of TT electrodes. In an example embodiment, the ion trap apparatus further comprises or is in electrical communication with a number of TT electrode drivers, each TT electrode driver in electrical communication with one TT electrode via a corresponding TT lead. In an example embodiment, each TT electrode of the two or more sequences of TT electrodes is operated independently. In an example embodiment, each TT electrode of the number of sequences of TT electrodes is configured to be biased with a TT voltage in the range of approximately −20 Volts to +20 Volts. In an example embodiment, the ion trap apparatus is part of a trapped ion quantum computer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a perspective view of a surface ion trap apparatus and/or package, in accordance with an example embodiment.

FIG. 2 provides a schematic diagram of a quantum computer comprising an ion trap apparatus, in accordance with an example embodiment.

Figure 6:
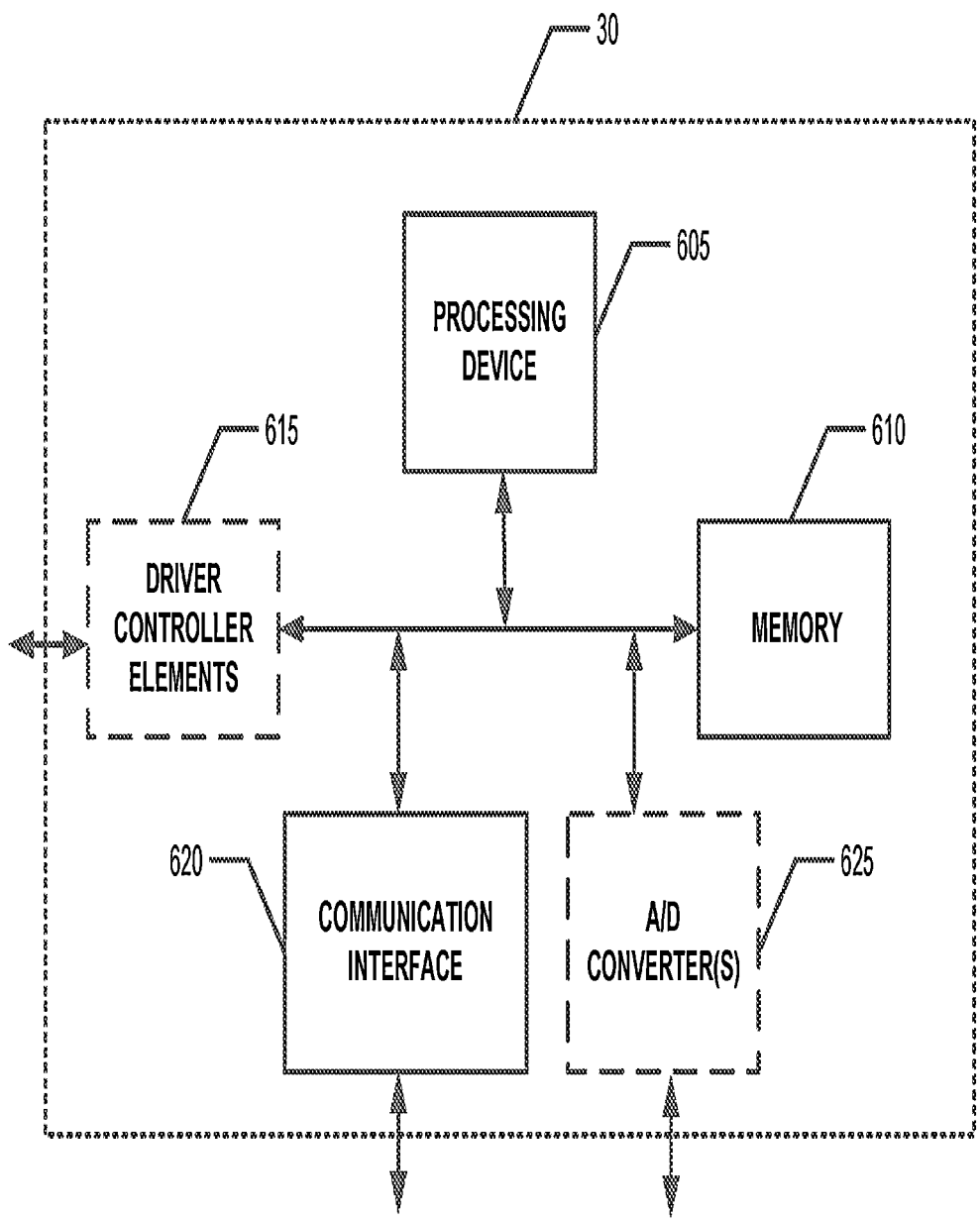

FIG. 6 provides a schematic diagram of an example controller of a quantum computer comprising an ion trap apparatus, in accordance with an example embodiment.

Figure 7:
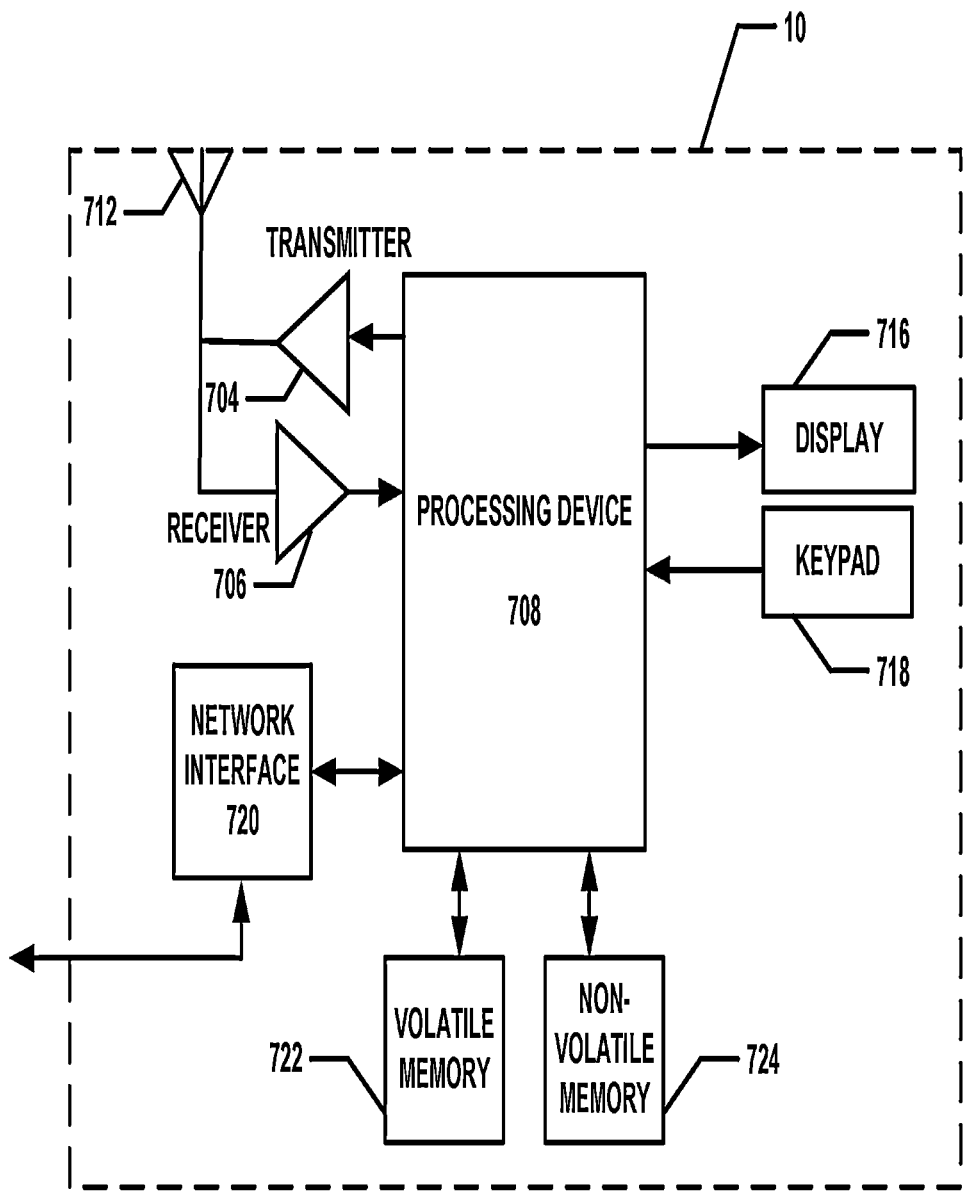

FIG. 7 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

Exemplary Ion Trap Apparatus

Figure 1:
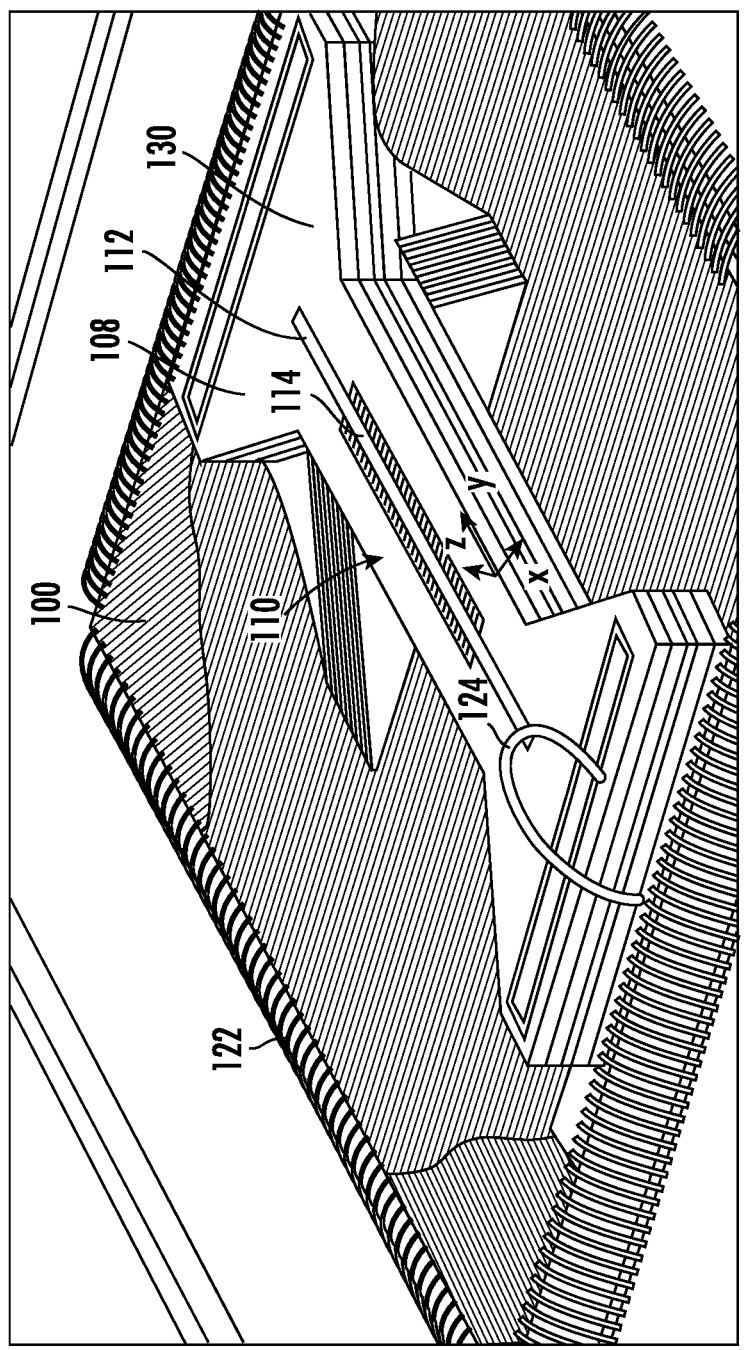
Figure 3:
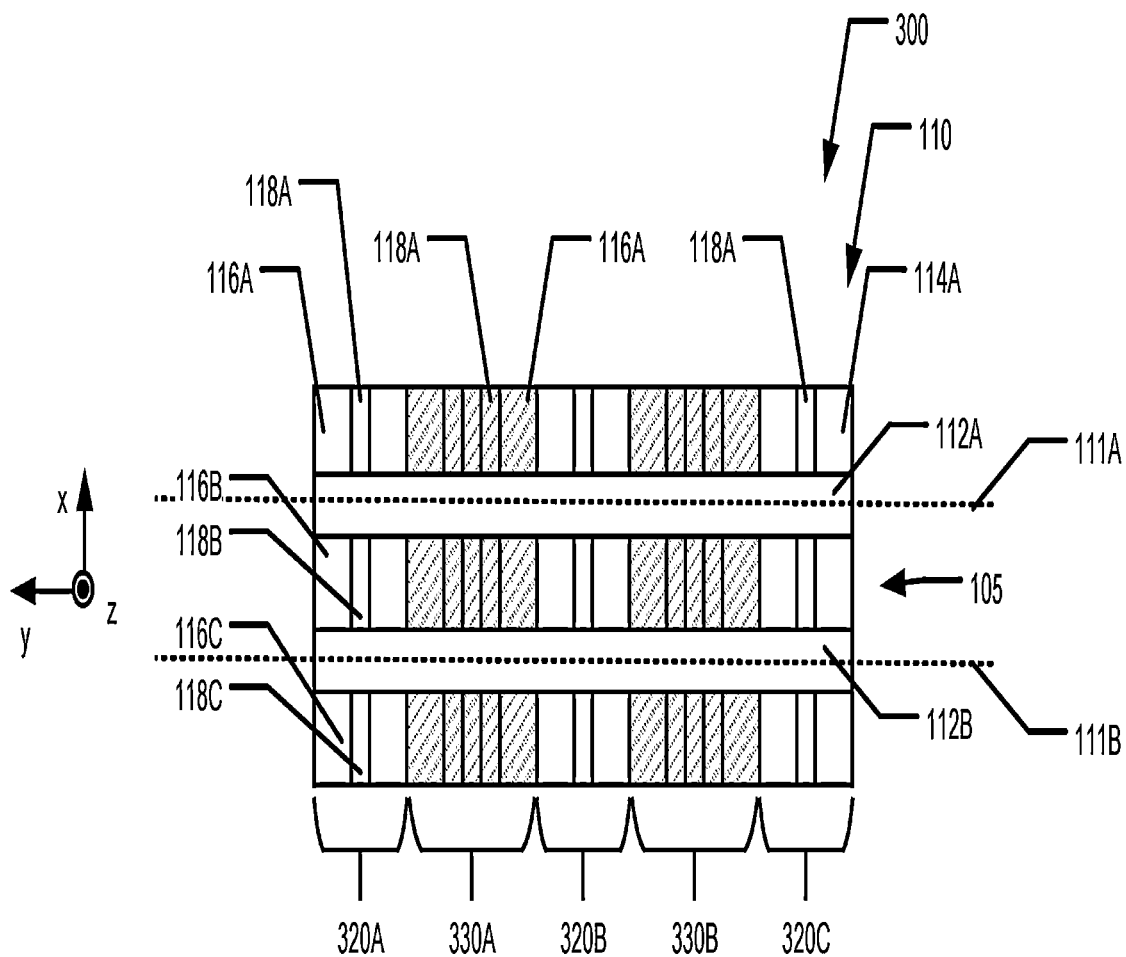
FIG. 3 is a top view of a portion of an ion trap having an example architecture, in accordance with an example embodiment.
Figure 4:
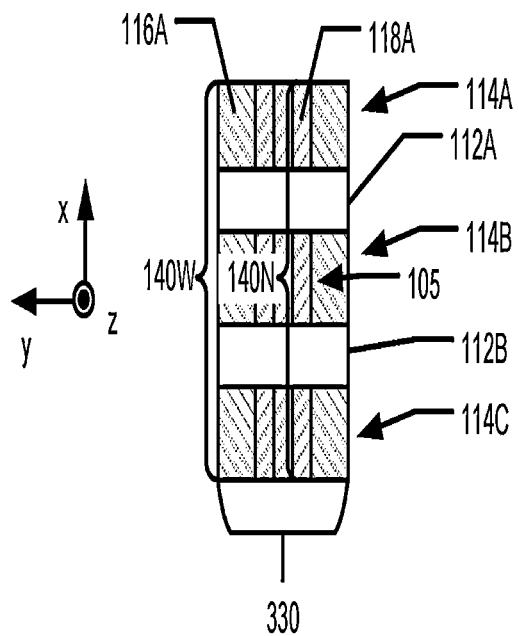
FIG. 4 illustrates a portion of the ion trap shown in FIG. 3.
Figure 5:
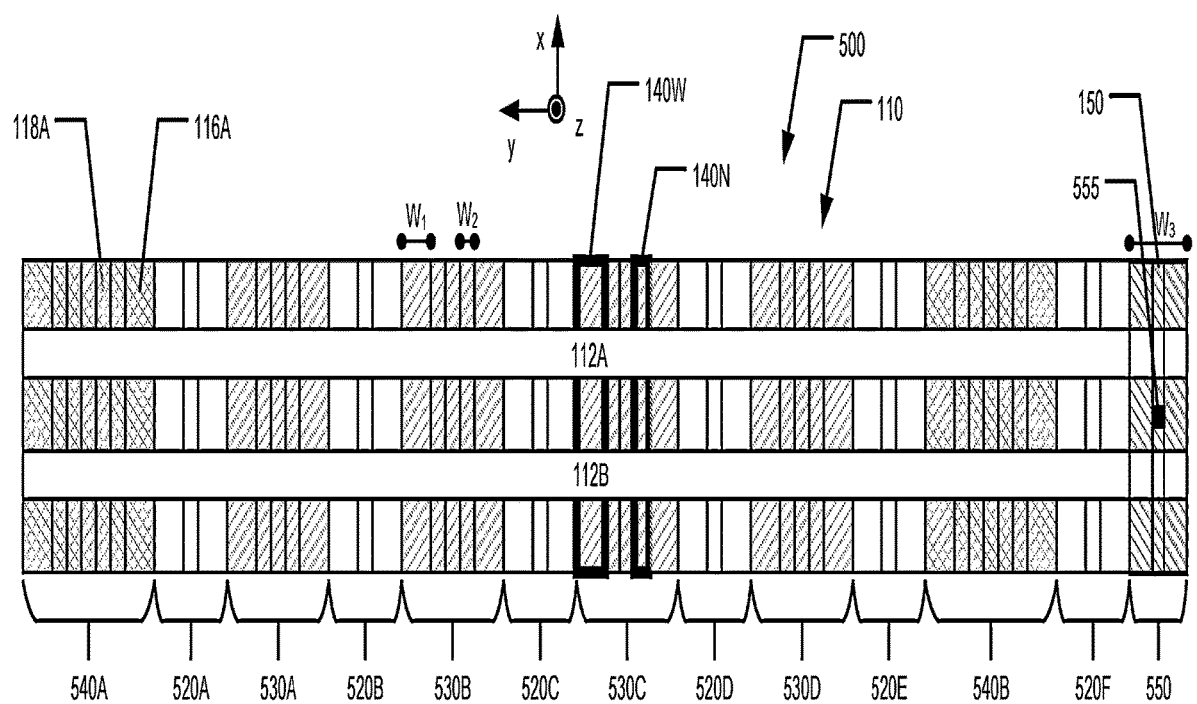
FIG. 5 is a top view of a portion of another ion trap having another example architecture, in accordance with an example embodiment.

FIG. 1 provides a perspective view of an example embodiment of an ion trap apparatus and/or package 100. In various embodiments, the ion trap apparatus and/or package 100 comprises an ion trap chip 108 having an ion trap ion trap 110 defined thereby and/or thereon. FIGS. 3-5 illustrate at least portions, from a top view, of some example ion traps 110. In various embodiments, the ion trap 110 is a surface ion trap. In various embodiments, the ion trap apparatus and/or package 100 comprises an ion trap chip 108 having an ion trap 110 defined thereby and/or thereon at least partially by a number of radio frequency (RF) rails 112 (e.g., 112A, 112B). In various embodiments, the ion trap apparatus and/or package 100 comprises an ion trap 110 at least partially defined by a number of sequences of TT electrodes 114 (e.g., 114A, 114B, 114C). In an example embodiment, the ion trap 110 is a surface Paul trap with symmetric RF rails. In various embodiments, the upper surface of the ion trap 110 has a planarized topology. For example, the upper surface of each RF rail 112 of the number of RF rails 112 and the upper surface of each TT electrode 116 (e.g., 116A, 116B, 116C), 118 (e.g., 118A, 118B, 118C) of the number of sequences of TT electrodes 114 may be substantially coplanar. For example, in an example embodiment, the thickness (e.g., in the z-direction) of the RF rails 112 and the TT electrodes 116, 118 are approximately equal. In an example embodiment, the thickness of the RF rails 112 and/or the TT electrodes 116, 118 is in the range of approximately 0.1-20 μm. For example, the thickness of the RF rails 112 and/or the TT electrodes 116, 118 is in the range of approximately 0.1-20 μm. In an example embodiment, the thickness of the first and third sequences of electrodes 114A, 114C is greater than the thickness of the RF rails 112 and the second sequence of electrodes 114B, which may have substantially the same thickness.

In various embodiments, the height (e.g., in the x-direction) of the RF rails 112 and/or the TT electrodes 116, 118 is in the range of approximately 40 μm to 500 μm. In an example embodiment, the height of the RF rails 112 and the first, second, and third sequences of electrodes 114A, 114B, 114C are approximately equal. In an example embodiment, the height of the first sequence of electrodes 114A and the height of the third sequence of electrodes 114C are approximately equal. In an example embodiment, the height of the second sequence of electrodes 114B may be smaller than the height of first and/or third sequence of electrodes 114A, 114C. In an example embodiment, the height of the RF rails 112 are approximately equal.

In various embodiments, the ion trap 110 is at least partially defined by a number of RF rails 112. The RF rails 112 are formed with substantially parallel longitudinal axes 111 (e.g., 111A, 111B) and with substantially coplanar upper surfaces. For example, the RF rails 112 are substantially parallel such that a distance between the RF rails 112 is approximately constant along the length of the RF rails 112 (e.g., the length of an RF rail being along the longitudinal axes 111 of RF rail). For example, the upper surfaces of the RF rails 112 may be substantially flush with the upper surface of the ion trap apparatus and/or package 100. In an example embodiment, the number of RF rails 112 comprises two RF rails 112 (e.g., 112A, 112B). In various embodiments, the ion trap 110 may comprise a plurality of number of RF rails 112. For example, the ion trap 110 may be a two-dimensional ion trap that comprises multiple numbers (e.g., pairs and/or sets) of RF rails 112 with each number (e.g., pair and/or set) of RF rails 112 having substantially parallel longitudinal axes 111. In an example embodiment, a first number of RF rails 112 have mutually substantially parallel longitudinal axes 111, a second number of RF rails 112 have mutually substantially parallel longitudinal axes 111, and the longitudinal axes of the first number of RF rails and the longitudinal axes of the second number of RF rails are substantially non-parallel (e.g., transverse). FIG. 1 illustrates two RF rails 112, though other embodiments may comprise additional RF rails in various configurations. In various embodiments, the height of the RF rails (e.g., dimension of the RF rails in the x-direction) and/or thickness of the RF rails (e.g., dimension of the RF rails in the z-direction) may be varied as suitable for particular applications. As shown in FIGS. 1 and 3-5, as used herein, the x-axis corresponds to a transverse direction of the ion trap 110 (e.g., perpendicular/orthogonal to the longitudinal direction of ion trap and in the plane of the surface ion trap 110), the y-axis corresponds to a longitudinal direction of the ion trap 110, and the z-axis corresponds to vertical direction relative to an upper surface of the ion trap. For example, the longitudinal axes 111 of the number of RF rails 112 are substantially parallel to the y-axis.

As illustrated in FIG. 1, in various embodiments, a number of RF rails 112 can be fabricated above an upper surface of a substrate 130. In various embodiments, other materials (e.g., dielectrics, insulators, shields, etc.) can be formed between the substrate 130 and components (e.g., RF rails 112, sequences of TT electrodes 114) fabricated above the upper surface of the substrate 130. As shown in FIG. 1, each of the RF rails 112 may be formed with substantially parallel longitudinal axes 111 (e.g., that are substantially parallel to the y-axis). As noted in some embodiments (e.g., two-dimensional ion trap embodiments), a first set of RF rails 112 may be formed with substantially parallel axes (e.g., that are substantially parallel to the y-axis), and a second set of RF rails 112 may be formed with substantially parallel axes (e.g., that are substantially parallel to the x-axis) and that are substantially non-parallel (e.g., transverse) with respect to the longitudinal axis of each RF rail of the first set of RF rails 112. In various embodiments, each of the RF rails 112 are formed with substantially coplanar upper surfaces (e.g., that define a plane substantially parallel to the x-y plane).

In various embodiments, two adjacent RF rails 112 may be separated (e.g., insulated) from one another by a longitudinal gap 105. For example, the longitudinal gap may define (in one or two dimensions) the confinement channel or region of the ion trap 110 in which one or more ions may be trapped at various locations within the trap. In various embodiments, the longitudinal gap 105 defined thereby may extend substantially parallel to the longitudinal axes 111 of the adjacent RF rails 112. For example, the longitudinal gap 105 may extend substantially parallel to the y-axis. In an example embodiment, the longitudinal gap 105 may be at least partially filled with an insulating material (e.g., a dielectric material). In various embodiments, the dielectric material may be silicon dioxide (e.g., formed through thermal oxidation) and/or other dielectric and/or insulating material. In various embodiments, the longitudinal gap 105 has a height (e.g., in the x-direction) of approximately 40 μm to 500 μm. In various embodiments, one or more sequences of TT electrodes 114 (e.g., a second sequence of TT electrodes 114B) may be disposed and/or formed within the longitudinal gap 105.

In an example embodiment, a transverse gap may exist between neighboring and/or adjacent electrodes 116, 118 of the one or more sequences of electrodes 114. In an example embodiment, the transverse gap may be empty space and/or at least partially filled with a dielectric material to prevent electrical communication between neighboring and/or adjacent electrodes. In an example embodiment, the transverse gap between neighboring and/or adjacent electrodes may be in the range of approximately 1-10 μm.

In an example embodiment, a longitudinal gap exists between a sequence of TT electrodes 114 and a neighboring and/or adjacent RF rail 112. In an example embodiment, the longitudinal gap may be at least partially filled with a dielectric and/or insulating material to prevent electrical communication between TT electrodes 116, 118 of the sequence of electrodes 114 and the RF rail 112. In an example embodiment, the longitudinal gap between neighboring and/or adjacent electrodes may be in the range of approximately 1-10 μm.

In various embodiments, the RF rails 112 may be fabricated from a conductive material (e.g., copper, silver, gold, and/or the like) or alloys of two or more conductive materials selected as suitable for conduction and/or transmission of an appropriate signal. In various embodiments, an RF rail 112 may be fabricated, for example, from copper with a cross-sectional thickness (in the z-direction) of approximately 0.1 to 10 In various embodiments, the RF rail 112 may be fabricated with a cross-sectional height (in the x-direction) in a range of from approximately 50 μm to approximately 350 In an example embodiment, the cross-sectional area of the RF rails (e.g., in an xz plane) is determined as appropriate to conduct a current (e.g., from around 0.01 A to around 10.0 A) oscillating at an RF frequency (e.g., from around 3 Hz to 0.3 GHz).

In various embodiments, the ion trap 110 may be at least partially defined by a number of sequences of TT electrodes 114 (e.g., first sequence of TT electrodes 114A, second sequence of electrodes 114B, third sequence of TT electrodes 114C). Each sequence of TT electrodes 114 is formed to extend substantially parallel to the substantially parallel longitudinal axes 111 of the RF rails 112. For example, the number of sequences of TT electrodes 114 may extend substantially parallel to the y-axis as shown in FIG. 1. In various embodiments, the number of sequences of TT electrodes 114 comprises two, three, four, and/or another number of sequences of TT electrodes 114. In an example embodiment, the ion trap 110 comprises a plurality of number of sequences of TT electrodes 114. For example, the ion trap 110 may be a two-dimensional ion trap that comprises multiple numbers of sequences of TT electrodes 114 that each extend substantially parallel to a substantially parallel longitudinal axes of a corresponding number of RF rails 112. In an example embodiment, a first number of sequences of TT electrodes 114 extend substantially parallel to the substantially parallel longitudinal axes 111 of a first number of RF rails 112, a second number of sequences of TT electrodes 114 extend substantially parallel to the substantially parallel longitudinal axes 111 of a second number of RF rails 112, and the longitudinal axes of the first number of RF rails and the longitudinal axes of the second number of RF rails are substantially non-parallel (e.g., transverse). In some embodiments, each of the TT electrodes 116, 118 of the number of sequences of TT electrodes 114 can be formed with substantially coplanar upper surfaces that are substantially coplanar with the upper surfaces of the RF rails 112.

In an example embodiment (e.g., as illustrated in FIGS. 3-5), a number (e.g., pair) of RF rails 112 may be formed between a first sequence of TT electrodes 114A and a third sequence of TT electrodes 114C with a second sequence of TT electrodes 114B extending along the longitudinal channel 105 between the RF rails 112. For example, each sequence of TT electrodes 114 may extend in a direction substantially parallel to the longitudinal axes 111 of the RF rails (e.g., in the y-direction). In various embodiments, the upper surfaces of the sequences of TT electrodes 114 are substantially coplanar with the upper surfaces of the RF rails 112. In other words, the RF rails 112 and TT electrodes 116, 118 may be formed with substantially the same thickness (e.g., in the z-direction). In an example embodiment, the first and second sequences of electrodes 114A, 114B may have a greater thickness (z-dimension) and/or height (x-dimension) than the RF rails 112 and the third sequence of electrodes 114C, which may have substantially the same thickness and/or height.

In various embodiments, the number of sequences of TT electrodes 114 may be fabricated as a plurality of matched TT electrodes. For example, as shown in FIGS. 3-5, a first sequence of TT electrodes 114A may include a first TT electrode (e.g., 116A, 118A), a second sequence of TT electrodes 114B may include a second TT electrode (e.g., 116B, 118B), and a third sequence of TT electrodes 114C may include a third TT electrode (e.g., 116C, 118C). The first TT electrode 116A, 118A, second TT electrode 116B, 118B, and third TT electrode 116C, 118C may be a matched group of TT electrodes 140 (e.g., 140W, 140N, as shown in FIG. 4). For example, the first, second, and third TT electrodes 116A, 116B, 116C or 118A, 118B, 118C may be colinear along a line substantially perpendicular to the substantially parallel longitudinal axes 111 of the corresponding RF rails 112. For example, the first, second, and third TT electrodes 116A, 116B, 116C or 118A, 118B, 118C may be colinear along a line substantially parallel to the x-axis. For example, the first, second, and third TT electrodes 116A, 116B, 116C or 118A, 118B, 118C may have the same width (e.g., in the y-direction) and maybe aligned (e.g., be positioned at a same forward edge and/or backward edge) in the longitudinal direction of the ion trap 110 (e.g., in the y-direction). For example, a sequence of TT electrodes 114 comprises a plurality of TT electrodes 116, 118 that are aligned in the longitudinal direction (e.g., y-axis) of the ion trap 110. A matched group of TT electrodes 140 comprises a plurality of TT electrodes 116A, 116B, 116C or 118A, 118B, 118C that are aligned in a direction transverse and/or perpendicular to the longitudinal direction of the ion trap 110. For example, a matched group of TT electrodes 140 comprises a plurality of TT electrodes 116, 118 that are aligned in the x-direction.

In various embodiments, the ion trap 110 comprises a plurality of wide TT electrodes 116 and a plurality of narrow TT electrodes 118. A wide TT electrode 116 is longer and/or wider, in a dimension substantially parallel to the longitudinal direction of the ion trap 110 (e.g., substantially parallel to the y-axis), than a narrow TT electrode 118. In an example embodiment, each wide TT electrode 116 of the ion trap 110 has approximately a first width $W_1$ in a direction substantially parallel to the longitudinal direction of the ion trap 110 (e.g., the y-direction) and each narrow TT electrode 118 of the ion trap 110 has approximately a second width $W_2$ in a direction substantially parallel to the longitudinal direction of the ion trap 110, with the first width $W_1$ being longer and/or wider than the second width $W_2$. In various embodiments, the first width $W_1$ is approximately at least twice the second width $W_2$. In an example embodiment, the first width $W_1$ is approximately two times to approximately six times the second width $W_2$. In an example embodiment, the first width $W_1$ is approximately three times to approximately five times the second width $W_2$. In various embodiments, the ion trap 110 may comprise TT electrodes having a width (in a direction that is substantially parallel to the longitudinal direction of the ion trap 110, aka the y-direction) that is longer and/or wider than the first width, between the first and second width, or narrower than the second width, as appropriate for the application. In an example embodiment, the first width $W_1$ is in the range of approximately 100 to 300 µm. In an example embodiment, the second width $W_2$ is in the range of approximately 25 to 150 µm.

In various embodiments, a sequence of TT electrodes 114 comprises both wide TT electrodes 116 and narrow TT electrodes 118. In various embodiments, a matched group of TT electrodes consists of only wide TT electrodes 116 (e.g., wide matched groups of TT electrodes 140W) or only narrow TT electrodes 118 (e.g., narrow matched groups of TT electrodes 140N). For example, a matched group of TT electrodes 140 does not contain both wide TT electrodes 116 and narrow TT electrodes 118, in an example embodiment.

In various embodiments, the sequences of TT electrodes 114 are arranged and/or formed into a number of zones, as shown in FIGS. 3 and 4. For example, the zones may comprise action zones, intermediary zones, storage zones, and/or the like. Each zone may comprise two wide matched groups TT electrodes 140W on the periphery of the zone and at least one narrow matched group TT electrodes 140N disposed between the two wide TT electrodes. As noted above, the wide TT electrodes 116 are longer and/or wider in a direction substantially parallel to the substantially parallel longitudinal axes 111 (e.g., in the y-direction) of the RF rails 112 than the at least one narrow TT electrode 118. In various embodiments, each zone maybe optimized for a particular function and/or set of functions that are to take place in the zone. In various embodiments, the functions may include transportation of an ion through at least a portion of the zone, stabilizing and/or storing the ion within the zone, manipulating the ion via a manipulation source (e.g., laser beam, microwave field, and/or the like), interacting two or more ions, swapping and/or separating two ions (e.g., dividing two ions that were in the same potential well into two distinct and/or separate potential wells), and/or other functions that may enable the controlled evolution of a quantum state of one or more ions trapped within the ion trap 110. In various embodiments, the ion trap 110 may comprise one or more repeated patterns of zones.

In various embodiments, RF signals may be applied to the RF rails 112 to generate an electric and/or magnetic field that acts to maintain an ion trapped within the ion trap 110 in directions transverse to the longitudinal direction of the ion trap 110 (e.g., the x- and z-directions). In various embodiments, TT voltages may be applied to the TT electrodes 116, 118 to maintain and/or cause transport of an ion trapped in the ion trap 110 in the longitudinal direction of the ion trap 110 (e.g., in the y-direction).

In various embodiments, the number of sequences of TT electrodes 114 may, in combination, be biased, with TT voltages that contribute to a variable combined electrical and/or magnetic field to trap at least one ion in a potential well above at least one of either an upper surface of the sequences of TT electrodes 114 and/or the RF rails 112. For example, the electrical and/or magnetic field generated at least in part by voltages applied to the TT electrodes of the sequences of TT electrodes 114 may trap at least one ion in a potential well above the upper surface of the second sequence of TT electrodes 114B and/or the longitudinal gap 105.

Figure 2:
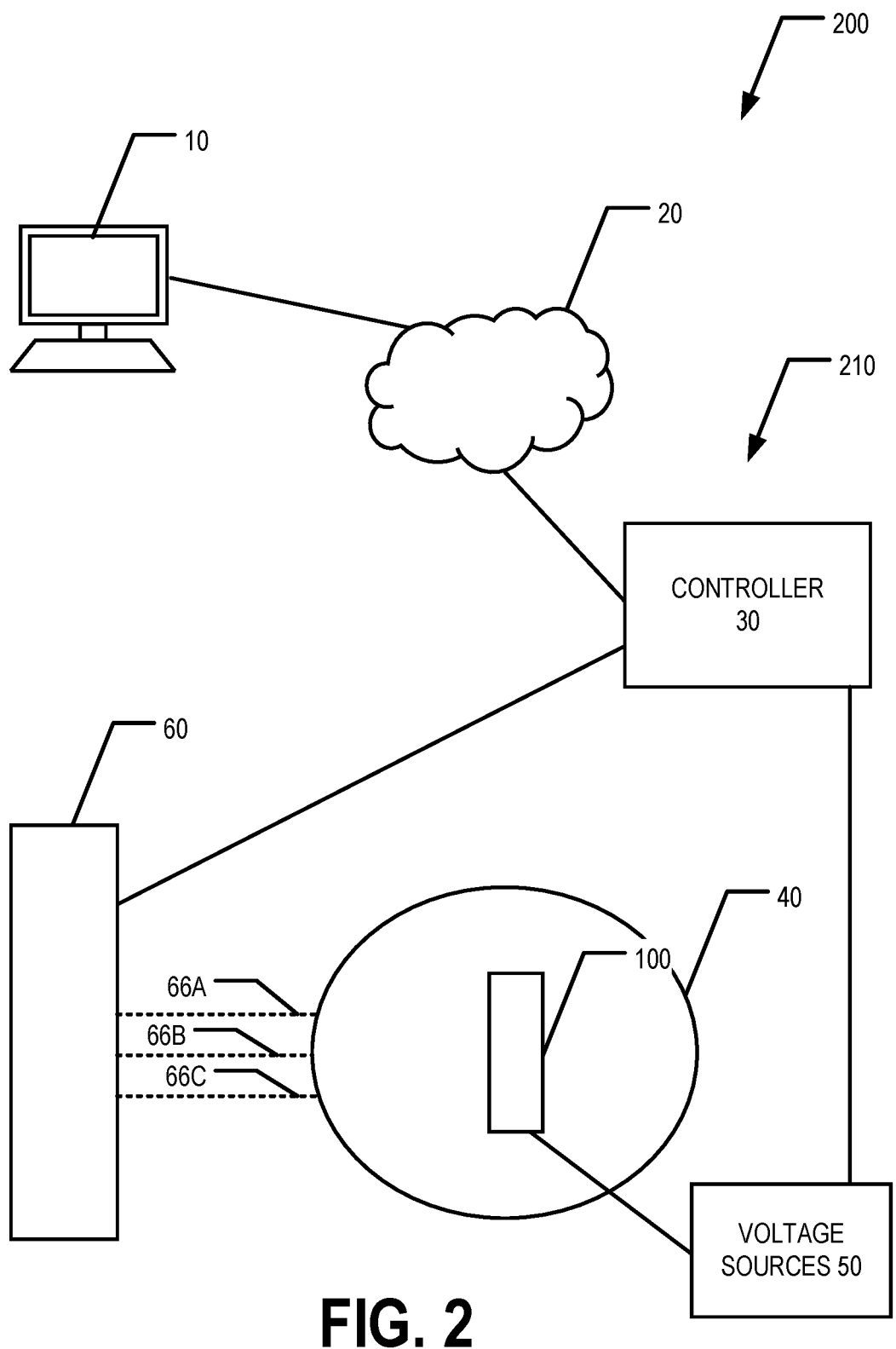

The at least one ion can be trapped in variable locations in the ion trap 110 by the electrical and/or magnetic fields being controlled by one or more connected devices (e.g., a controller 30 as shown in FIG. 2 and/or the like) via leads 122, 124. For example, depending on the positive or negative charge on the at least one ion, TT voltages may be raised or lowered for TT electrodes 116, 118 on either side of a particular TT electrode to promote transit of the at least one ion to the particular TT electrode and/or to form an electrical potential well that resists further transit of the at least one ion.

Depending on such factors as the charge on the at least one ion and/or the shape and/or magnitude of the combined electrical and/or magnetic fields, the at least one ion can be stabilized at a particular distance (e.g., approximately 20 µm to approximately 200 µm) above an upper surface of the ion trap 110 (e.g., the coplanar upper surface of the sequences of TT electrodes 114 and RF rails 112). To further contribute to controlling transit between the variable locations and/or stabilizing the at least one ion trapped in a particular location, the ion trap 110 may be operated within a cryogenic and/or vacuum chamber capable of cooling the ion trap to a temperature of less than 124 Kelvin (e.g., less than 100 Kelvin, less than 50 Kelvin, less than 10 Kelvin, less than 5 Kelvin, and/or the like), in various embodiments.

As shown in FIG. 1, the ion trap apparatus 100 may further comprise a plurality of TT leads, wire bonds, interconnects, and/or the like (referred to herein as TT leads 122). For example, the TT leads 122 may enable electrical communication between a TT voltage driver and/or voltage source and a corresponding one of the TT electrodes. For example, a TT electrode may be biased with a TT voltage generated and/or provided by a TT voltage driver and/or voltage source via a corresponding one of the TT leads 122. The ion trap apparatus 100 may further comprise RF leads, wire bonds, interconnects, and/or the like (referred to herein as RF leads 124). For example, the RF leads 124 may enable electrical communication between an RF driver and/or voltage source and the RF rails 112. For example, the RF rails 112 may be biased with a voltage that alternates at an RF rate and that is generated and/or provided by an RF driver and/or voltage source via RF leads 124.

In various embodiments, the ion trap 110 is designed and/or configured to minimize the number of input/outputs (I/O) (e.g., number of TT leads 122) and electrodes 116, 118 of the ion trap 110 while simultaneously allowing all needed transport operations for performing ion manipulation in accordance with the intended application (e.g., operations for using ions within the ion trap 110 as qubits of a quantum computer, in an example embodiment). In various embodiments, the design of the electrodes 116, 118 maximizes the harmonic and quartic potential energy coefficients of the electrical and/or magnetic field generated by biasing the electrodes 116, 118 while fulfilling other constraints of the intended application.

Exemplary Quantum Computer Comprising an Ion Trap Apparatus

FIG. 2 provides a schematic diagram of an example quantum computer system 200 comprising an ion trap apparatus and/or package 100, in accordance with an example embodiment. In various embodiments, the quantum computer system 200 comprises a computing entity 10 and a quantum computer 210. In various embodiments, the quantum computer 210 comprises a controller 30, a cryostat and/or vacuum chamber 40 enclosing an ion trap apparatus and/or package 100, and one or more manipulation sources 60. In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more ions within the ion trap 110 of the ion trap apparatus and/or package 100. For example, in an example embodiment, wherein the one or more manipulation sources 60 comprise one or more lasers, the lasers may provide one or more laser beams to the ion trap 110 within the cryogenic and/or vacuum chamber 40. In various embodiments, the quantum computer 210 comprises one or more voltage sources 50. For example, the voltage sources 50 may comprise a plurality of TT voltage drivers and/or voltage sources and/or at least one RF driver and/or voltage source. The voltage sources 50 may be electrically coupled to the corresponding TT electrodes 116, 118 and/or RF rails 112 of the ion trap apparatus and/or package 100 via the corresponding leads 122, 124.

In various embodiments, a computing entity 10 is configured to allow a user to provide input to the quantum computer 210 (e.g., via a user interface of the computing entity 10) and receive, view, and/or the like output from the quantum computer 210. The computing entity 10 may be in communication with the controller 30 of the quantum computer 210 via one or more wired or wireless networks 20 and/or via direct wired and/or wireless communications. In an example embodiment, the computing entity 10 may translate, configure, format, and/or the like information/data, quantum computing algorithms, and/or the like into a computing language, executable instructions, command sets, and/or the like that the controller 30 can understand and/or implement.

In various embodiments, the controller 30 is configured to control the voltage sources 50, cryogenic system and/or vacuum system controlling the temperature and pressure within the cryogenic and/or vacuum chamber 40, manipulation sources 60, and/or other systems controlling various environmental conditions (e.g., temperature, pressure, and/or the like) within the cryogenic and/or vacuum chamber 40 and/or configured to manipulate and/or cause a controlled evolution of quantum states of one or more ions within the ion trap 110. In various embodiments, the ions trapped within the ion trap 110 are used as qubits of the quantum computer 210.

Exemplary Ion Trap Architecture

FIG. 3 provides an example zone architecture 300 of an example embodiments of an ion trap 110. As shown in FIG. 3, the ion trap 110 comprises a number (e.g., pair) of RF rails 112 (e.g., 112A, 112B) formed with substantially parallel longitudinal axes 111 (e.g., 111A, 111B). The RF rails 112 are formed with substantially coplanar upper surfaces. FIG. 3 illustrates a top view of the ion trap 110 such that the upper surface of the RF rails 112 and the sequences of TT electrodes 114 are illustrated in the plane of the page. The example architecture 300 of the ion trap 110 comprises two action zones 330 (e.g., 330A, 330B) and three intermediary zones 320 (e.g., 320A, 320B, 320C). In various embodiments, an intermediary zone 320 is located adjacent to each action zone 330. For example, intermediary zones 320A and 320B are adjacent action zone 330A and intermediary zones 320B and 320C are adjacent action zone 330B. For example, each action zone 330 is adjacent, on either side, to an intermediary zone 320 such that each action zone 330 is neighbored by two intermediary zones 320. In other words, when an ion is transported out of an action zone 330, the ion enters an intermediary zone 320 prior to entering any other action zone 330.

In various embodiments, an intermediary zone 320 comprises two wide matched groups of TT electrodes 140W (e.g., a matched group of TT electrodes comprising a wide TT electrode from each sequence of TT electrodes of the number of sequences of TT electrodes). For example, an intermediary zone 320 may comprise two wide TT electrodes 116 from each sequence of TT electrodes (e.g., a matched group of wide TT electrodes 116A, 116B, 116C). Between the two wide matched groups of TT electrodes 140W, is at least one narrow matched group of TT electrodes 140N (e.g., a matched group of TT electrodes comprising a narrow TT electrode from each sequence of TT electrodes of the number of sequences of TT electrodes). For example, an intermediary zone may comprise at least one narrow TT electrode 118 from each sequence of TT electrodes (e.g., a matched group of narrow TT electrodes 118A, 118B, 118C). The at least one narrow matched group of TT electrodes 140N is disposed between the two wide matched groups of TT electrodes 140W of the intermediary zone 320. In an example embodiment, each intermediary zone 320 consists of two wide matched groups of TT electrodes 140W and one narrow matched group of TT electrodes 140N disposed and/or formed between the two wide matched groups of TT electrodes 140W. In an example embodiment, a wide TT electrode 116 is approximately at least twice as wide (e.g., in a dimension that is substantially parallel to the y-axis) as a narrow TT electrode 118. For example, a wide TT electrode 116 may be in the range of approximately two times to approximately six times longer and/or wider than a narrow TT electrode 118. In an example embodiment, a wide TT electrode 116 is in the range of approximately three times to approximately five times longer and/or wider than a narrow TT electrode 118. In various embodiments, an intermediary zone 320 is configured for stabilizing and/or storing an ion therein, separating at least one ion from a potential well having multiple ions therein into a different potential well, and for transporting the ion therethrough. In various embodiments, an intermediary zone 320 is configured and/or designed to accommodate storage and/or stabilization of one or more ions during various ion transport steps.

In various embodiments, an action zone 330 comprises two wide matched groups of TT electrodes 140W. For example, an action zone 330 may comprise two wide TT electrodes 116 from each sequence of TT electrodes (e.g., 116A, 116B, 116C). Between the two wide matched groups of TT electrodes 140W, at least one narrow matched group of TT electrodes 140N is disposed and/or formed. For example, an action zone 330 may comprise at least one narrow TT electrode 118 from each sequence of TT electrodes (e.g., 118A, 118B, 118C). The at least one narrow matched group of TT electrodes 140N is disposed between the two wide matched groups of TT electrodes 140W of the action zone 330. In an example embodiment, each action zone comprises at least two narrow matched groups of TT electrodes 140N disposed between the two wide matched groups of TT electrodes 140W of the action zone 330. In an example embodiment, each action zone 330 consists of two wide matched groups of TT electrodes 140W and three narrow matched groups of TT electrodes 140N disposed between the two wide matched groups of TT electrodes 140W. In an example embodiment, a wide TT electrode 116 is approximately at least twice as wide as a narrow TT electrode 118. For example, a wide TT electrode 116 may be in the range of approximately two times to approximately six times longer and/or wider (e.g., in a dimension that is substantially parallel to the y-axis) than a narrow TT electrode 118. In an example embodiment, a wide TT electrode 116 is in the range of approximately three times to approximately five times longer and/or wider than a narrow TT electrode 118. In various embodiments, an action zone 330 is configured for acting on one or more ions using a manipulation source, interacting two or more ions, separating at least one ion from a potential well having multiple ions therein into a different potential well (e.g., swapping and/or separating two or more ions), and for transporting the ion therethrough. In various embodiments, an action zone 330 is configured and/or designed to provide predetermined laser and/or other manipulation source interaction areas where laser beams and/or other manipulation sources may be interacted with one or more ions trapped within the ion trap 110.

In various embodiments, the narrow TT electrodes 118 of an intermediary zone 320 and the narrow TT electrodes 118 of an action zone 330 have the same width (e.g., in a dimension substantially parallel to the y-axis). In an example embodiment, the width (e.g., in a dimension substantially parallel to the y-axis) of a narrow TT electrode 118 of an intermediary zone 320 and the width of a narrow TT electrode 118 of an action zone 330 are different. In various embodiments, the wide TT electrodes 116 of an intermediary zone 320 and the wide TT electrodes 116 of an action zone 330 have the same width (e.g., in a dimension substantially parallel to the y-axis). In an example embodiment, the width (e.g., in a dimension substantially parallel to the y-axis) of a wide TT electrode 116 of an intermediary zone 320 and the width of a wide TT electrode 116 of an action zone 330 are different. For example, in an example embodiment, the width of a wide TT electrode of an action zone 330 is longer and/or wider than the width of a wide TT electrode of an intermediary zone 320. In an example embodiment, the width of a wide TT electrode of an action zone 330 is approximately 20-40 µm longer and/or wider than the width of a wide TT electrode of an intermediary zone 320.

Another Exemplary Ion Trap Architecture

FIG. 5 provides an example zone architecture 500 of an example embodiments of an ion trap 110. As shown in FIG. 5, the ion trap 110 comprises a number (e.g., pair) of RF rails 112 (e.g., 112A, 112B) formed with substantially parallel longitudinal axes 111. The RF rails 112 are formed with substantially coplanar upper surfaces. FIG. 5 illustrates a top view of the ion trap 110 such that the upper surface of the RF rails 112 and the sequences of TT electrodes 114 are illustrated in the plane of the page. The illustrated example architecture 400 of the ion trap 110 comprises four action zones 530 (e.g., 530A, 530B, 530C, 530D), six intermediary zones 520 (e.g., 520A, 520B, 520C, 520D, 520E, 520F), two storage zones 540 (e.g., 540A, 540B), and a loading zone 550. Various embodiments may comprise more or fewer action zones 530, more or fewer storage zones 540, and a corresponding greater or lesser number of intermediary zones 520. For example, an example embodiment comprises five action zones 530, two storage zones 540, eight intermediary zones 520, and one loading zone 550. A variety of numbers of action zones 530, storage zones 540, intermediary zones 520 and various arrangements thereof may be used in various embodiments, as appropriate for the application.

In various embodiments, an intermediary zone 520 is disposed between adjacent actions zones 530, between an action zone 530 and an adjacent storage zone 540, and/or between the loading zone 550 and an adjacent action zone 530 and/or storage zone 540. For example, intermediary zone 520B is disposed and/or formed between adjacent action zones 530A and 530B. For example, intermediary zone 520A is disposed and/or formed between storage zone 540A and action zone 530A. For example, intermediary zone 520F is disposed between storage zone 540B and loading zone 550. For example, an intermediary zone 520 may be directly adjacent each action zone 530, storage zone 540, and loading zone 550. In other words, when an ion is transported out of an action zone 530, storage zone 540, and/or loading zone 550, the ion enters an intermediary zone 520 prior to entering any other action zone 530 and/or storage zone 540.

In various embodiments, an intermediary zone 520 comprises two wide matched groups of TT electrodes 140W (e.g., a matched group of TT electrodes comprising a wide TT electrode from each sequence of TT electrodes of the number of sequences of TT electrodes). For example, an intermediary zone 520 may comprise two wide TT electrodes 116 from each sequence of TT electrodes 114 (e.g., a matched group of wide TT electrodes 116A, 116B, 116C). Between the two wide matched groups of TT electrodes 140W, is at least one narrow matched group of TT electrodes 140N (e.g., a matched group of TT electrodes comprising a narrow TT electrode from each sequence of TT electrodes 114 of the number of sequences of TT electrodes 114A, 114B, 114C). For example, an intermediary zone 520 may comprise at least one narrow TT electrode 118 from each sequence of TT electrodes (e.g., a matched group of narrow TT electrodes 118A, 118B, 118C). The at least one narrow matched group of TT electrodes 140N is disposed between the two wide matched groups of TT electrodes 140W of the intermediary zone 520. In an example embodiment, each intermediary zone 520 consists of two wide matched groups of TT electrodes 140W and one narrow matched group of TT electrodes 140N disposed and/or formed between the two wide matched groups of TT electrodes 140W. In an example embodiment, a wide TT electrode 116 is approximately at least twice as wide (e.g., in a dimension that is substantially parallel to the y-axis) as a narrow TT electrode 118. For example, a wide TT electrode 116 may be in the range of approximately two times to approximately six times longer and/or wider than a narrow TT electrode 118. In an example embodiment, a wide TT electrode 116 is in the range of approximately three times to approximately five times longer and/or wider than a narrow TT electrode 118. In various embodiments, an intermediary zone 520 is configured for stabilizing and/or storing an ion therein, separating at least one ion from a potential well having multiple ions therein into a different potential well, and for transporting the ion therethrough. In various embodiments, an intermediary zone 520 is configured and/or designed to accommodate storage and/or stabilization of one or more ions during various ion transport steps.

In various embodiments, an action zone 530 comprises two wide matched groups of TT electrodes 140W. For example, an action zone 530 may comprise two wide TT electrodes 116 from each sequence of TT electrodes (e.g., 116A, 116B, 116C). Between the two wide matched groups of TT electrodes 140W, at least one narrow matched group of TT electrodes 140N is disposed and/or formed. For example, an action zone 330 may comprise at least one narrow TT electrode 118 from each sequence of TT electrodes (e.g., 118A, 118B, 118C). The at least one narrow matched group of TT electrodes 140N is disposed between the two wide matched groups of TT electrodes 140W of the action zone 530. In an example embodiment, each action zone 530 comprises at least two narrow matched groups of TT electrodes 140N disposed between the two wide matched groups of TT electrodes 140W of the action zone 530. In an example embodiment, each action zone 530 consists of two wide matched groups of TT electrodes 140W and three narrow matched groups of TT electrodes 140N disposed between the two wide matched groups of TT electrodes 140W. In an example embodiment, a wide TT electrode 116 is approximately at least twice as wide as a narrow TT electrode 118. For example, a wide TT electrode 116 may be in the range of approximately two times to approximately six times longer and/or wider (e.g., in a dimension that is substantially parallel to the y-axis) than a narrow TT electrode 118. In an example embodiment, a wide TT electrode 116 is in the range of approximately three times to approximately five times longer and/or wider than a narrow TT electrode 118. In various embodiments, an action zone 530 is configured for acting on one or more ions using a manipulation source, interacting two or more ions, separating at least one ion from a potential well having multiple ions therein into a different potential well (e.g., swapping and/or separating two or more ions), and for transporting and/or trapping the ion therethrough. In various embodiments, an action zone 530 is configured and/or designed to provide predetermined laser and/or other manipulation source interaction areas where laser beams and/or other manipulation sources may be interacted with one or more ions trapped within the ion trap 110.

In various embodiments, a storage zone 540 comprises two wide matched groups of TT electrodes 140W (e.g., a matched group of TT electrodes comprising a wide TT electrode from each sequence of TT electrodes of the number of sequences of TT electrodes). For example, a storage zone 540 may comprise two wide TT electrodes 116 from each sequence of TT electrodes (e.g., a matched group of wide TT electrodes 116A, 116B, 116C. Between the two wide matched groups of TT electrodes 140W, is at least two narrow matched group of TT electrodes 140N (e.g., a matched group of TT electrodes comprising a narrow TT electrode from each sequence of TT electrodes 114 of the number of sequences of TT electrodes 114A, 114B, 114C). For example, storage zone 540 may comprise at least two narrow TT electrode 118 from each sequence of TT electrodes (e.g., a matched group of narrow TT electrodes 118A, 118B, 118C). The at least two narrow matched group of TT electrodes 140N are disposed between the two wide matched groups of TT electrodes 140W of the storage zone 540. In an example embodiment, each storage zone 540 consists of two wide matched groups of TT electrodes 140W and at least three narrow matched groups of TT electrodes 140N disposed and/or formed between the two wide matched groups of TT electrodes 140W. For example, in the illustrated embodiment, a storage zone 540 comprises five narrow matched groups of TT electrodes 140N disposed and/or formed between the two wide matched groups of TT electrodes 140W of the storage zone 540. In an example embodiment, a wide TT electrode 116 is approximately at least twice as wide (e.g., in a dimension that is substantially parallel to the y-axis) as a narrow TT electrode 118. For example, a wide TT electrode 116 may be in the range of approximately two times to approximately six times longer and/or wider than a short TT electrode 118. In an example embodiment, a wide TT electrode 116 is in the range of approximately three times to approximately five times longer and/or wider than a short TT electrode 118. In various embodiments, a storage zone 540 is configured for stabilizing and/or storing an ion therein, swapping and/or separating two ions (e.g., dividing two ions that were in the same potential well into two distinct and/or separate potential wells), and for transporting the ion at least partially therethrough. In various embodiments, a storage zone 540 is configured and/or designed to accommodate storage and/or stabilization of one or more ions during various ion transport steps. For example, an ion trapped within the ion trap 110 may be stored in a storage zone 540 while a plurality of actions are being applied to other ions trapped within the ion trap 110.

In various embodiments, the loading zone 550 is configured to receive ions from an ion source such that ions may be loaded into the ion trap 110. For example, the loading zone 550 may comprise a loading hole 555. The loading hole is a through hole extending through the ion trap 110 and through the substrate 130 to allow an ion source to be disposed below the ion trap apparatus and/or package 100 such that an atom from the ion source may travel through the loading hole 555 into the loading zone 550. Once the atom enters the loading zone 550 through the loading hole 555, the atom may be ionized and the resulting ion may become trapped due to the electrical and/or magnetic fields and/or corresponding potential generated by the number of sequences of TT electrodes 114 and the number of RF rails 112. In an example embodiment, an atom may enter the loading zone 550 via the loading hole 555 and be interacted with by a manipulation source (e.g., a laser beam) that ionizes the atom such that the resulting atom is trapped within the ion trap 110. In various embodiments, the loading zone 550 may be configured to receive an ion (or atom) through the loading hole 555, stabilize the ion (e.g., an ionized atom) within the loading zone 550, enable manipulation of the ion via one or more manipulation sources (e.g., to initialize the ion and/or to ensure the ion is in a known, initial quantum state), and/or the like. The loading zone 550 may be further configured to aid in the transport of the ion out of the loading zone 550 and into a directly adjacent intermediary zone 520.

In an example embodiment, the loading zone 550 may comprise one or more loading TT electrodes 150. For example, the loading zone 550 may comprise at least one loading TT electrode 150 from each sequence of TT electrodes 114 of the number of sequences of TT electrodes. In various embodiments, the loading TT electrodes 150 may comprise wide and/or short TT electrodes in matched groups 140 (e.g., 140W and/or 140N). In an example embodiment, the loading TT electrodes 150 comprise at least one wide matched group of TT electrodes 140W. In an example embodiment, the width of the loading TT electrodes 150 may be different from the width of the wide and/or narrow TT electrodes 116, 118. For example, the loading TT electrodes 150 may of a third width $W_3$ that is different from the first and/or second widths $W_1$, $W_2$ corresponding to the wide and narrow TT electrodes 116, 118. In various embodiments, the third width $W_3$ may be longer and/or wider than the first width $W_1$, narrower than the second width $W_2$, and/or in a range between the first and second widths $W_1$, $W_2$.

In various embodiments, the narrow TT electrodes 118 of an intermediary zone 520 and the narrow TT electrodes 118 of an action zone 530 and/or storage zone 540 have the same width $W_2$ (e.g., in a dimension substantially parallel to the y-axis). In an example embodiment, the width (e.g., in a dimension substantially parallel to the y-axis) of a narrow TT electrode 118 of an intermediary zone 520 and the width of a narrow TT electrode 118 of an action zone 530 and/or storage zone 520 are different. In various embodiments, the wide TT electrodes 116 of an intermediary zone 520 and the wide TT electrodes 116 of an action zone 530 and/or storage zone 540 have the same width Li (e.g., in a dimension substantially parallel to the y-axis). In an example embodiment, the width (e.g., in a dimension substantially parallel to the y-axis) of a wide TT electrode 116 of an intermediary zone 520 and the width of a wide TT electrode 116 of an action zone 530 and/or storage zone 540 are different.

Technical Advantages

Various embodiments provide technical solutions to the technical problem of providing an ion trap apparatus that provides sufficient ion location control, enables various ion transport functions (e.g., transport ions, separating two or more ions within one potential well into different potential wells, swapping and/or separating two ions (e.g., dividing two ions that were in the same potential well into two distinct and/or separate potential wells) and/or the like), and enables manipulation of ions within the ion trap via manipulation sources. The novel zone architecture incorporating electrodes of different sizes enables for predetermined manipulation source (e.g., laser), interaction areas (e.g., action zones), and ion storage areas (e.g. intermediary zones, storage zones) to accommodate storage during various ion transportation steps while minimizing the number of I/Os of the ion trap apparatus and/or package 100 and the number of electrodes 116, 118 of the ion trap 110.

Exemplary Controller

In various embodiments, an ion trap apparatus and/or package 100 is incorporated into a quantum computer 210. In various embodiments, a quantum computer 210 further comprises a controller 30 configured to control various elements of the quantum computer 210. For example, the controller 30 may be configured to control the voltage sources 50, a cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more ions within the ion trap 110.

As shown in FIG. 6, in various embodiments, the controller 30 may comprise various controller elements including processing elements 605, memory 610, driver controller elements 615, a communication interface 620, analog-digital converter elements 625, and/or the like. For example, the processing elements 605 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 605 of the controller 30 comprises a clock and/or is in communication with a clock.

For example, the memory 610 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 610 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language (s), and/or the like), and/or the like. In an example embodiment, execution of at least a portion of the computer program code stored in the memory 610 (e.g., by a processing element 605) causes the controller 30 to perform one or more steps, operations, processes, procedures and/or the like described herein for tracking the phase of an atomic object within an atomic system and causing the adjustment of the phase of one or more manipulation sources and/or signal(s) generated thereby.

In various embodiments, the driver controller elements 615 may include one or more drivers and/or controller elements each configured to control one or more drivers. In various embodiments, the driver controller elements 615 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 605). In various embodiments, the driver controller elements 615 may enable the controller 30 to operate a manipulation source 60. In various embodiments, the drivers may be laser drivers; vacuum component drivers; drivers for controlling the flow of current and/or voltage applied to TT, RF, and/or other electrodes used for maintaining and/or controlling the ion trapping potential of the ion trap 110; cryogenic and/or vacuum system component drivers; and/or the like. For example, the drivers may control and/or comprise TT and/or RF voltage drivers and/or voltage sources that provide voltages and/or electrical signals to the TT electrodes 116, 118 and/or RF rails 112 via leads 122, 124. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 625 configured to receive signals from one or more optical receiver components, calibration sensors, and/or the like.

In various embodiments, the controller 30 may comprise a communication interface 620 for interfacing and/or communicating with a computing entity 10. For example, the controller 30 may comprise a communication interface 620 for receiving executable instructions, command sets, and/or the like from the computing entity 10 and providing output received from the quantum computer 210 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 7 provides an illustrative schematic representative of an example computing entity 10 that can be used in conjunction with embodiments of the present invention. In various embodiments, a computing entity 10 is configured to allow a user to provide input to the quantum computer 210 (e.g., via a user interface of the computing entity 10) and receive, display, analyze, and/or the like output from the quantum computer 210.

As shown in FIG. 7, a computing entity 10 can include an antenna 712, a transmitter 704 (e.g., radio), a receiver 706 (e.g., radio), and a processing element 708 that provides signals to and receives signals from the transmitter 704 and receiver 706, respectively. The signals provided to and received from the transmitter 704 and the receiver 706, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 716 and/or speaker/speaker driver coupled to a processing element 708 and a touch screen, keyboard, mouse, and/or microphone coupled to a processing element 708). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 718 (hard or soft), a touch display, voice/speech or motion interfaces, scanners, readers, or other input device. In embodiments including a keypad 718, the keypad 718 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 722 and/or non-volatile storage or memory 724, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SWIM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An ion trap apparatus comprising:
    at least two radio frequency (RF) rails; and
    two or more sequences of trapping and/or transport (TT) electrodes with each sequence formed to extend substantially parallel to at least a portion of the at least two RF rails, the at least two RF rails and the two or more sequences of TT electrodes defining at least a portion of an ion trap,
    wherein the two or more sequences of TT electrodes comprises a first electrode and a second electrode, the first electrode and second electrode being different from one another in at least one of size or shape.

2. The ion trap apparatus of claim 1, wherein the first electrode and the second electrode being different from one another in at least one of size or shape comprises a width of the first electrode being wider in a direction substantially parallel to at least a portion of at least two RF rails than a width of the second electrode in the direction substantially parallel to at least a portion of at least two RF rails.

3. The ion trap apparatus of claim 1, wherein the ion trap is one of a one-dimensional ion trap or a two-dimensional ion trap.

4. The ion trap apparatus of claim 1, wherein the two or more sequences of TT electrodes are organized into zones based at least in part on the size or shape of the TT electrodes.

5. The ion trap apparatus of claim 4, wherein the first electrode and the second electrode are in a same zone.

6. The ion trap apparatus of claim 1, wherein the two or more sequences of TT electrodes are arranged into matched groups, the first electrode and the second electrode being in different matched groups.

7. The ion trap apparatus of claim 1, wherein the two or more sequences of TT electrodes are configured to be operated so as to cause an ion within the ion trap to be transported along at least a portion of a confinement region, the confinement region extending substantially parallel to the at least two RF rails.

8. An ion trap apparatus comprising:
a one or more first radio frequency (RF) rails;
a first set of two or more sequences of trapping and/or transport (TT) electrodes with each sequence formed to extend substantially parallel to at least a portion of the one or more first RF rails;
a one or more second RF rails; and
a second set of two or more sequences of TT electrodes with each sequence formed to extend substantially parallel to at least a portion of the one or more second RF rails,
wherein the one or more first RF rails are transverse to the one or more second RF rails,
wherein the one or more first RF rails, the first set of two or more sequences of TT electrodes, the one or more second RF rails, and the second set of two or more sequences of TT electrodes define, at least in part, a two-dimensional ion trap,
wherein at least one of (a) the first set of two or more sequences of TT electrodes or (b) the second set of two or more sequences of TT electrodes comprises a first electrode and a second electrode, the first electrode and the second electrode being different from one another in at least one of size or shape.

9. The ion trap apparatus of claim 8, wherein the first electrode and the second electrode being different from one another in at least one of size or shape comprises a width of the first electrode being wider than a width of the second electrode in a direction substantially parallel to the respective one of (a) the one or more first RF rails or (b) the one or more second RF rails.

10. The ion trap apparatus of claim 8, wherein the first set of two or more sequences of TT electrodes are arranged into a number of zones.

11. The ion trap apparatus of claim 10, wherein each zone comprises at least one wide matched group of TT electrodes of the first set of two or more sequences of TT electrodes and at least one narrow matched group of TT electrodes, wherein a wide TT electrode of the at least one wide matched group of TT electrodes is wider in a direction substantially parallel to the at least one first RF rail than a narrow TT electrode of the at least one narrow match group of TT electrodes.

12. The ion trap apparatus of claim 10, wherein the number of zones comprises at least one action zone, the at least one action zone configured for an action to be performed on at least one ion within the at least one action zone.

13. The ion trap apparatus of claim 12, wherein the action is performed by at least one of (a) applying at least one manipulation signal to the at least one ion or (b) interacting the at least one ion with another ion within the at least one action zone.

14. The ion trap apparatus of claim 10, wherein the plurality of zones comprises at least one intermediary zone, the at least one intermediary one configured for stabilizing at least one ion within the intermediary zone during a transport operation of the at least one ion.

15. An ion trap apparatus comprising:
at least two radio frequency (RF) rails; and
two or more sequences of trapping and/or transport (TT) electrodes with each sequence formed to extend substantially parallel to at least a portion of a respective at least one of the at least two RF rails, the at least two RF rails and the two or more sequences of TT electrodes defining at least a portion of an ion trap,
wherein the two or more sequences of TT electrodes are arranged into a plurality of zones, wherein each zone is configured to have a respective at least one function take place in the zone.

16. The ion trap apparatus of claim 15, wherein:
the at least two RF rails comprise at least one first RF rail and at least one second RF rail, wherein the at least one first RF rail is transverse to the at least one second RF rail,
the two or more sequences of TT electrodes comprises a first set of two or more TT electrodes that are formed to extend substantially parallel to at least a portion of the at least one first RF rail and a second set of two or more TT electrodes that are formed to extend substantially parallel to at least a portion of the at least one second RF rail such that the at least one first RF rail, the first set of two or more TT electrodes, the at least one second RF rail, and the second set of two or more TT electrodes define at least a portion of a two-dimensional ion trap.

17. The ion trap apparatus of claim 15, wherein the plurality of zones comprises at least one action zone, the at least one action zone configured for an action to be performed on at least one ion within the at least one action zone.

18. The ion trap apparatus of claim 17, wherein the action is performed by at least one of (a) applying at least one manipulation signal to the at least one ion or (b) interacting the at least one ion with another ion within the at least one action zone.

19. The ion trap apparatus of claim 17, wherein the at least one action zone is configured to have a quantum logic gate performed on an ion within the at least one action zone.

20. The ion trap apparatus of claim 15, wherein the plurality of zones comprises at least one intermediary zone, the at least one intermediary one configured for stabilizing at least one ion within the intermediary zone during a transport operation of the at least one ion.

* * * * *